(12) United States Patent
Rigaud et al.

(10) Patent No.: US 9,486,763 B2
(45) Date of Patent: Nov. 8, 2016

(54) THERMOCHEMICAL SYSTEM HAVING A HOUSING MADE OF A COMPOSITE MATERIAL

(75) Inventors: Laurent Rigaud, Saint Nazaire (FR); Francis Kindbeiter, Corneilla del Vercol (FR); Laurent Dutruy, Villeneuve de la Raho (FR)

(73) Assignee: SOCIETE COLDWAY, Pia (FR)

( * ) Notice: Subject to any disclaimer, the term of this patent is extended or adjusted under 35 U.S.C. 154(b) by 826 days.

(21) Appl. No.: 13/880,586

(22) PCT Filed: Oct. 20, 2011

(86) PCT No.: PCT/FR2011/000564
§ 371 (c)(1),
(2), (4) Date: Jul. 3, 2013

(87) PCT Pub. No.: WO2012/052633
PCT Pub. Date: Apr. 26, 2012

(65) Prior Publication Data
US 2013/0269369 A1    Oct. 17, 2013

(30) Foreign Application Priority Data
Oct. 20, 2010    (FR) ..................................... 10 04120

(51) Int. Cl.
*B01J 7/00*      (2006.01)
*F28D 20/00*     (2006.01)
(Continued)

(52) U.S. Cl.
CPC ................. *B01J 7/00* (2013.01); *F24H 1/185* (2013.01); *F25B 35/04* (2013.01); *F25D 5/00* (2013.01);
(Continued)

(58) Field of Classification Search
CPC ....... B01J 8/0285; B01J 7/00; F28D 20/003; F25B 17/08; F25B 17/083; F25B 17/086
See application file for complete search history.

(56) References Cited

U.S. PATENT DOCUMENTS 1,419,613 A * 6/1922 Charles .................. H05B 3/342
                                                338/212
(Continued)

FOREIGN PATENT DOCUMENTS

JP          54114490 A      9/1979
JP        2001215072 A      8/2001
(Continued)

OTHER PUBLICATIONS

Translation of Communication dated Aug. 4, 2015, issued by the Japan Patent Office in corresponding Japanese Application No. 2013-534355.

*Primary Examiner* — Lessanework Seifu
(74) *Attorney, Agent, or Firm* — Sughrue Mion, PLLC

(57) ABSTRACT

The present invention relates to a thermochemical system comprising a reactor, or an enclosure for storing a solid reactive material capable of absorbing a gas, the reactive material and the gas being such that, when placed together, a chemical reaction occurs which results in the gas being absorbed by the reactive material, and a reverse chemical reaction occurs, wherein the gas absorbed by the reactive material is desorbed when heating means are applied to said reactive material when the latter has absorbed the gas. Said thermochemical system is characterized in that the reactor consists of an outer housing which is made of a composite material and which contains a sealed inner housing containing the reactive material, the heating means being arranged between the two enclosures.

9 Claims, 3 Drawing Sheets

Figure 1:
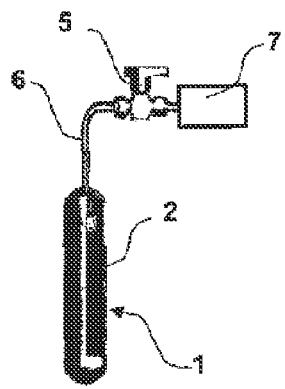

(51) Int. Cl.
  *F25D 5/00* (2006.01)
  *F25B 35/04* (2006.01)
  *F24H 1/18* (2006.01)
  *F25B 17/08* (2006.01)

(52) U.S. Cl.
  CPC ......... *F28D 20/003* (2013.01); *F24D 2220/10* (2013.01); *F25B 17/08* (2013.01); *Y02B 30/62* (2013.01); *Y02E 60/142* (2013.01)

(56) References Cited

U.S. PATENT DOCUMENTS 4,205,531 A * 6/1980 Brunberg ................ F25B 17/08
  62/101

5,875,648 A * 3/1999 Boye ....................... F25B 35/04
  156/172
2008/0199372 A1* 8/2008 Rigaud ................... F25B 17/08
  422/198

FOREIGN PATENT DOCUMENTS

| | | |
|---|---|---|
| JP | 2002357373 A | 12/2002 |
| JP | 200365437 A | 3/2003 |
| JP | 200375451 A | 3/2003 |
| JP | 2004286177 A | 10/2004 |
| JP | 2005536583 A | 12/2005 |
| WO | 2007021055 A1 | 2/2007 |

* cited by examiner

THERMOCHEMICAL SYSTEM HAVING A HOUSING MADE OF A COMPOSITE MATERIAL

The present invention relates to improvements in thermochemical systems of the type intended to be used in particular in refrigeration and/or heating systems as well as gas storage in salt form.

Such systems are known which exploit the properties of a highly exothermic reversible thermochemical reaction in which a reaction product, such as salts and in particular calcium chloride or barium chloride, absorbs a suitable gas, such as of ammonia. The reversibility of this reaction can, once it is completed, retrieve the original gas by heating the salts, so that the cycle can repeat.

This property has been used in cold production systems where the thermochemical system is brought into controlled communication with a tank containing the gas in liquid phase. When the two chambers are brought into communication, the liquid gas in the tank evaporates, which absorbs a certain amount of heat, so that the tank is cooled, and the gas is absorbed by the reaction product thereby generating the above chemical reaction, so that the reactor is a source of heat. Once the reaction is complete, if the product contained in the reactor is heated, it releases the absorbed gas in the reaction product thereof and then condenses in the tank.

One can also use this system to ensure the storage of gas employed in the aforementioned thermochemical reaction.

It is understood that, due to the high pressures involved in the thermochemical reaction, the reactors able to be the site of such a reaction should have a high mechanical strength, and that is why they are made of resistant materials such as steel or preferably stainless steel.

Such a structure has many disadvantages. A first drawback is to only enable realization of reactors, the weight of which is high, which makes the use of these techniques uncompetitive in areas in which lightness of the equipment is called for.

Moreover, these reactors are made from expensive materials which require one to resort for their realization to both good technical expertise and specific equipment used by specialists, which is likely to encumber consistently the cost price of the system.

Finally, in such reactors, if it is desired to provide heating from the periphery of the latter, one is forced to use an external heating mantle. Such an arrangement is not satisfactory for use in so far as the external heating mantle is exposed during use of the reactor to various external sources of attack liable to damage it. In addition, provision of heating means within the same reactor with the reaction product also has the disadvantage of risking damage at the time of installation or simply in the course of use.

The present invention seeks to overcome these drawbacks by proposing a thermochemical system that combines low weight and good ease of manufacture and which, moreover, can fully integrate the heating means in the very enclosure of the reactor, thus avoiding any risk of damaging them.

The present invention thus relates to a thermochemical system of the type comprising a reactor or storage enclosure of a solid reaction product capable of absorbing a gas, wherein the reactant product and gas are such that when they are brought into the presence of one another, they undergo a chemical reaction with the effect of gas absorption by the reaction product and are subject to a reverse chemical reaction of desorption of gas absorbed by the reaction product under the action of heating means able to act on it when it has absorbed the gas, characterized in that the reactor consists of an outer shell made of composite material which contains a sealed inner envelope containing the reaction product, the heating means being arranged between the two enclosures.

Preferably the heating means are disposed on the outer surface of the inner casing. They may be formed of at least one electrical resistor wound substantially helically on the outer surface of the inner casing. They may also consist of a heating tissue.

The reactor of the thermochemical system according to the invention may preferably be cylindrical. It may comprise means for distribution of the gas inside thereof.

Such diffusion means may be constituted by a diffuser arranged at the core of the reactive product, substantially along the longitudinal axis of the reactor.

The diffusion means can also be arranged on the inner surface of the inner casing.

Such a thermochemical system is particularly useful for providing cold and/or heat and, to this end, it will include means for controlled communication of the reactor with a tank containing said gas in liquefied form.

Figure 3:
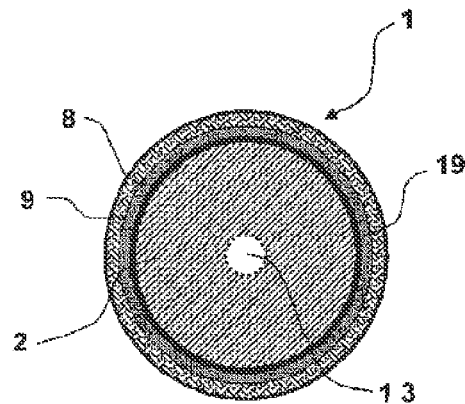
Figure 4:
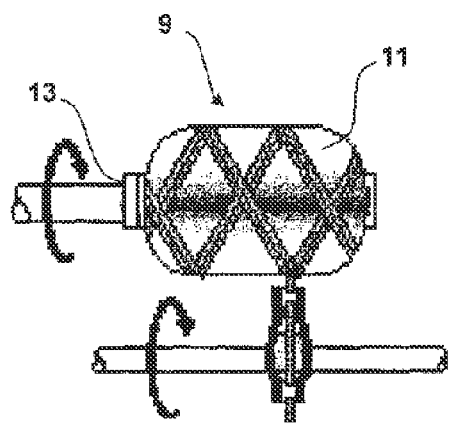
Figure 5:
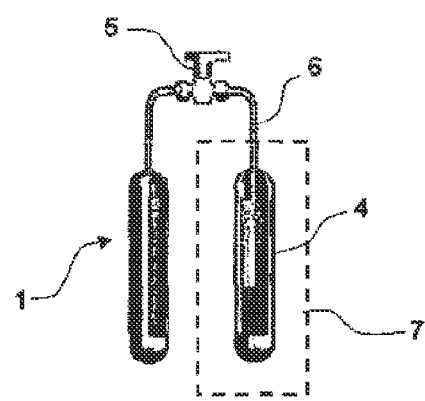
Figure 6:
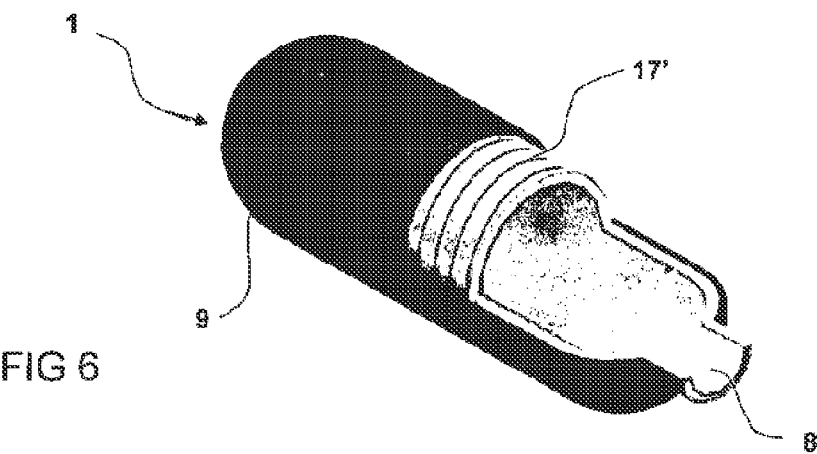
Figure 2:
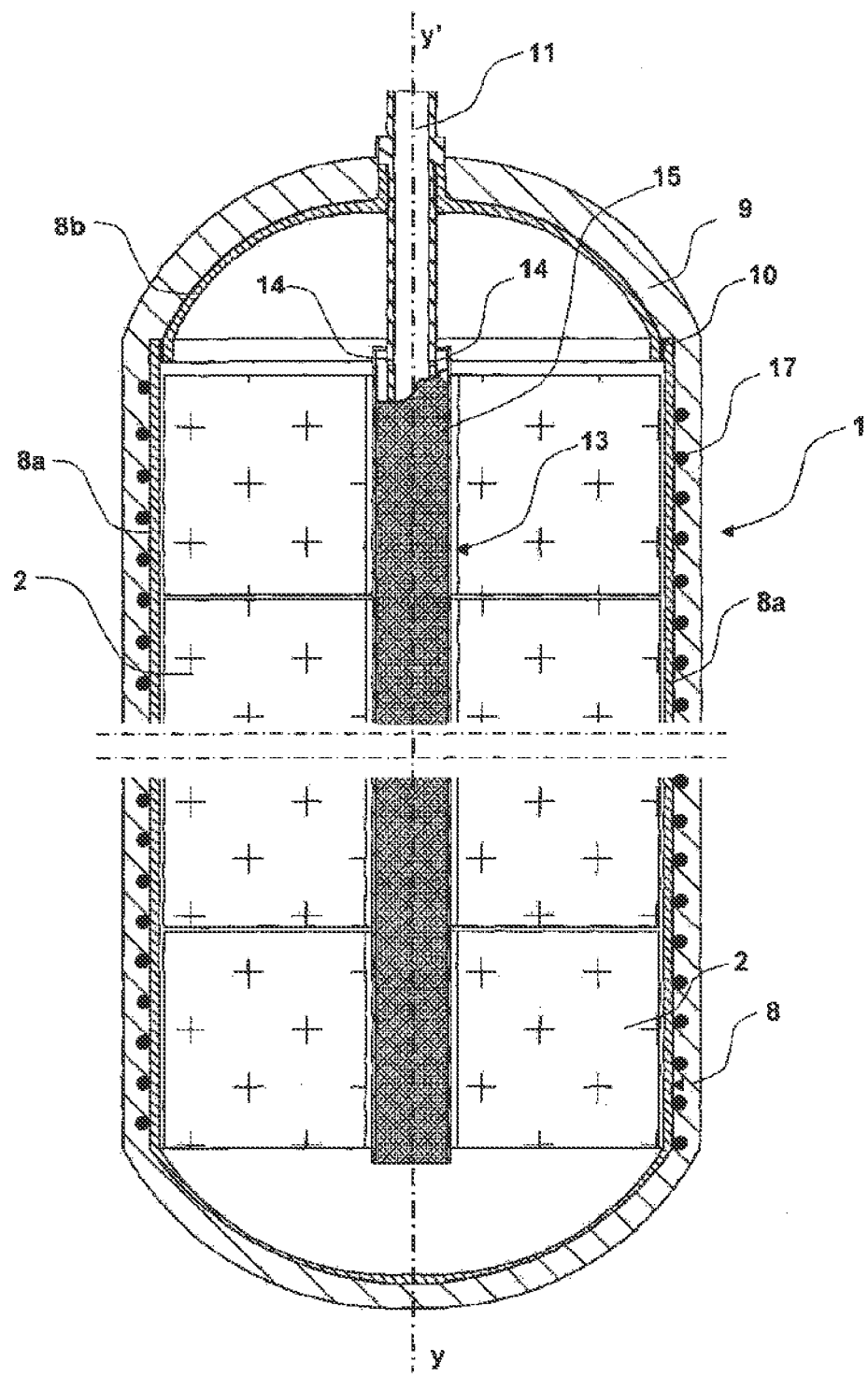
Figure 7:
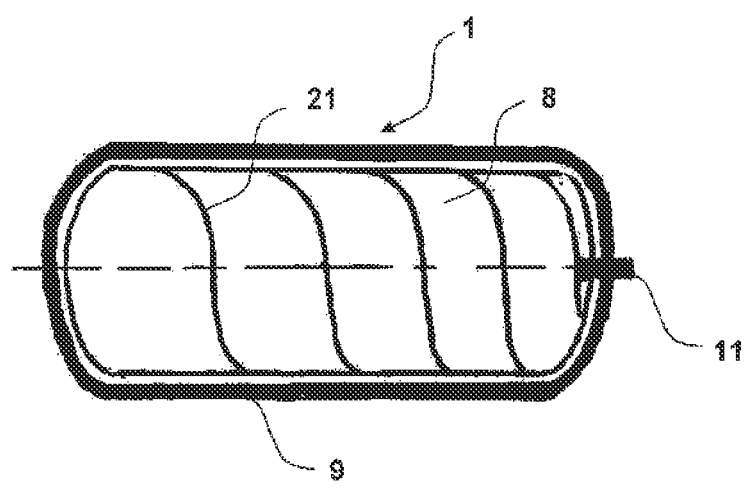

An embodiment of the present invention will be described below by way of a non-limiting example, with reference to the accompanying drawing in which:

FIG. 1 is a schematic view in partial section of the reactor, illustrating the principle of operation of a thermochemical system according to the invention in an application of the so-called "open" type, FIG. 2 is a longitudinal diametric section of a reactor employed in the inventive thermochemical system, FIG. 3 is a schematic view in diametric cross-section of an embodiment of a reactor according to the invention, FIG. 4 is a schematic view illustrating a method of manufacturing a reactor used in a thermochemical system according to the invention, FIG. 5 is a schematic view in partial section. of the reactor, illustrating the principle of operation of a thermochemical system according to the invention in an application of the so-called "closed" type, FIG. 6 is a schematic perspective view partly in section of a second embodiment of a reactor used in the thermochemical system according to the invention, FIG. 7 is a longitudinal diametric section of a reactor and illustrating a method of gas diffusion from the inner surface of the inner casing.

The thermochemical system shown schematically in FIG. 1, basically comprises a reactor 1 which contains a reaction product and 2 which is in communication via a pipe 6, under the control of a control valve 5, with means for 'outdoor use 7. As explained below and as is known, the reaction product and the specific gas are such that the reaction product is capable, by a thermochemical exothermic reaction, of absorbing and subsequently restoring the gas by an reverse thermochemical reaction when the reaction product 2 is heated.

In the embodiment of the present invention shown in FIG. 2, the body of the reactor 1 consists of two shells, namely an inner shell 8, or "liner", and an outer shell 9.

The inner shell 8 itself is formed of two metal elements, in particular of stainless steel, a cylindrical body 8 of limited thickness, on the order of 1 mm, the bottom of which is preferably hemispherical in shape and is open at its top part to receive a hemispherical head 8*b* which is attached to the body for example by a weld bead 10 so as to ensure adequate sealing against both gases and liquids.

The inner shell 8 receives the reagent product 2, which is arranged inside the latter preferably in the form of wafers which are stacked one on top of the other.

The head 8*b* is crossed along the longitudinal axis yy' of the tank 1 by a gas supply 11 which is fixed thereon and which extends to one conduit inside the reactor 1 substantially over the entire length thereof, therefrom by a diffuser 13. This diffuser through the reagent product 2 is intended to allow an even distribution of the gas in the reactor 1 necessary for the direct thermochemical reaction in addition to the gas outlet therefrom during the reverse thermochemical reaction activated by hearing the reagent product 2.

The diffuser 13 also allows gas diffusion in the reagent product according to a radial path. It was indeed found that the permeability of the reaction product 2 was optimal in such a direction, insofar as it is perpendicular to the direction of compaction which is performed axially.

In order to form the diffuser 13, the pipe 11 has holes 14 in the area through which it passes through the reactant material 2 and is surrounded by one or several filtering wire meshes 15.

According to the invention and as shown in FIG. 2, in order to provide the reaction product the heat required by the latter for activation of the reverse thermochemical reaction, heater elements are wound on the inner casing 8 which may consist of an electric heater 17 as shown in FIG. 2 or a heater 19 as shown in FIG. 3.

The outer shell 9 is subsequently formed on the inner casing 8. To this end, as shown schematically in FIG. 4, the inner shell may be used as a mandrel and after rotating it, fibers may be wound on its outer surface, such as for example carbon fibers, glass fibers or fibers of synthetic material such as Kevlar, to produce a form of skein which is subsequently or simultaneously with winding embedded in a thermosetting or thermoplastic resin such as, for example, an epoxy resin, polyester resin or polyamide.

The function of the composite outer shell 9 is to give the reactor 1, good mechanical strength and, to this end, the person skilled in the art will select the nature of the fibers and the resin used in addition to the thickness to be given to the walls of the envelope.

The present invention thus provides a reactor that not only has the characteristics of lightness specific to containers in composite material but, in addition, incorporates its own heating. This avoids the risk of damage to the external heating elements, such as heating mantles, which are not protected against external aggression or various internal heating elements which are located in the reactor and can be damaged or during the introduction of the reactant or product in the reactor during use.

In the known manner, the reagent product 2 which is contained in the reactor 1 is, for example, calcium chloride which has preferably been mixed with inert aggregates, e.g. made of expanded natural graphite (ENG) so as to increase its permeability and thereby promoting the diffusion of the gas within it. Once the mixture is carried out, it is compacted preferentially in the longitudinal direction yy' of the reactor 1.

The thermochemical system according to the invention which is shown in FIG. 1 can be used to perform several functions leading to various technical applications.

A particularly interesting application is one in which the thermochemical system is used for the production of heat and cold. In this application, known in itself, which is shown in FIG. 5, the external means of use 7 are constituted by a tank 4 which contains a liquid gas capable of reacting with the reaction product and which is stored in liquid phase.

In the known manner, the function of the system is established as described above. On opening the control valve 5, the gas stored in liquid phase in the tank 4 evaporates, absorbing heat, so that the tank 4 cools, and the gas is distributed by the diffuser 13 in the reagent 2 which captures the product according to the specific thermochemical reaction specific to the reaction product and the gas used; this reaction is exothermic, so that the reactor 1 is heated. The reaction is continued until all the gas in the tank 4 and the reaction product 2 is not saturated. If, subsequently, the reactor 1 is provided with heat by means of the electrical resistor 17 or heating 19 fabric, the reaction product 2 desorbs the gas which returns to the tank 4 where it condenses.

For example, in the case of a reaction product consisting of calcium chloride and a gas consisting of ammonia, the thermochemical reaction is:

$$Ca(NH_3)_6Cl_2 \leftrightarrow Ca(NH_3)_2Cl_2 + 4(NH_3) - \delta H_R$$

It can be seen that such a system is particularly interesting in that it can potentially store both heat (heating of the reactor 1) and cold (cooling of the tank 4) and moreover with a low weight and reduced dimensions.

In another embodiment of the invention shown in FIG. 6, the inner casing 8 is made of a synthetic material and its outer peripheral surface is recessed with a helical groove in which an electrical resistor 17' is arranged, which, as explained above, activates the reverse thermochemical reaction.

In another embodiment of the invention, the diffusion of the gas inside the reaction product 2 is provided by the inner casing 8. To this end, as shown in FIG. 7, the inner surface of the inner casing 8 is cut with a helical groove 21 through which the gas is brought into contact with the outer peripheral surface of the reaction product 2. To improve the distribution of gas within the latter, it is of course possible to provide several helical grooves 21 interspersed with each other.

In an alternative embodiment of the invention, it is possible to resort to additional means of heating or means of auxiliary heating, which are arranged in the central portion of the reactor close to its longitudinal axis xx'. These auxiliary means of heating may preferably be arranged around the diffuser 13. They may for example consist of a heating cartridge to be slipped over the diffuser 13.

The invention claimed is:

1. A thermochemical system of the type comprising a reactor comprising a solid reaction product suitable for absorbing a gas, the solid reaction product and the gas being such that when placed in presence of one another undergo a chemical reaction with the effect of gas absorption by the solid reaction product and undergo a reverse chemical reaction of desorption of gas absorbed by the solid reaction product, the desorption being produced by the action of heat applied to the solid reaction product when the solid reaction product has absorbed the gas, the thermochemical system further comprising heating means comprising an electric heating resistor, wherein the reactor comprises an outer casing of composite material and an inner casing, the inner casing contains the solid reaction product, and, wherein the inner casing comprises a synthetic material and comprises an outer peripheral surface, the outer peripheral surface comprises a recessed helical groove in which the electric heating resistor is arranged.

2. The thermochemical system of claim 1 wherein the inner casing is made of metal.

3. The thermochemical system according to claim 1, wherein the inner casing comprises a body and a head, the body comprising an upper part, the upper part being open, the casing being able to receive the solid reaction product and the head being able to be fixed in sealed manner on the body after insertion into the body of the solid reaction product.

4. The thermochemical system according to claim 1, wherein the reactor is cylindrical.

5. The thermochemical system according to claim 1, comprising auxiliary heating means, wherein the reactor comprises a central portion and wherein the auxiliary heating means are arranged near the central portion.

6. The thermochemical system according to claim 1, comprising a tank containing the gas in liquid form and means for controlling communication between the reactor and the tank.

7. The thermochemical system according to claim 1, comprising auxiliary heating means, wherein the reactor comprises a central portion and wherein the auxiliary heating means are arranged near the central portion.

8. The thermochemical system according to claim 1, comprising a tank containing the gas in liquid form and means for controlling communication between the reactor and the tank.

9. The thermochemical system of the type comprising a reactor comprising a solid reaction product suitable for absorbing a gas, the solid reaction product and the gas being such that when placed in presence of one another undergo a chemical reaction with the effect of gas absorption by the solid reaction product and undergo a reverse chemical reaction of desorption of gas absorbed by the solid reaction product, the desorption being produced by the action of heat applied to the solid reaction product when the solid reaction product has absorbed the gas, the thermochemical system further comprising heating means, wherein the reactor comprises an outer casing of composite material and an inner casing, the inner casing contains the solid reaction product, wherein the inner casing comprises a synthetic material, wherein the reactor is provided with gas diffusion means for diffusion of the gas therein, wherein the inner casing comprises an inner surface and wherein the gas diffusion means are provided on the inner surface of the inner casing.

* * * * *